US006722214B1

(12) United States Patent
Cole

(10) Patent No.: US 6,722,214 B1
(45) Date of Patent: Apr. 20, 2004

(54) CONTROL OF WEIGHT DURING EVAPORATION OF SAMPLES

(75) Inventor: Michael Cole, Saxmundham (GB)

(73) Assignee: Genevac Limited, Ipswich (GB)

( * ) Notice: Subject to any disclaimer, the term of this patent is extended or adjusted under 35 U.S.C. 154(b) by 0 days.

(21) Appl. No.: 09/508,133

(22) PCT Filed: Jun. 7, 1999

(86) PCT No.: PCT/GB99/01790

§ 371 (c)(1),
(2), (4) Date: Jun. 8, 2000

(87) PCT Pub. No.: WO00/14493

PCT Pub. Date: Mar. 16, 2000

(30) Foreign Application Priority Data

Sep. 5, 1998 (GB) ........................................ 9819286
Nov. 12, 1998 (GB) ........................................ 9824703

(51) Int. Cl.[7] ........................................ G01G 9/00
(52) U.S. Cl. ........................ 73/865; 159/6.1; 159/25.1; 177/50; 177/1
(58) Field of Search .................. 73/865, 1.13; 159/6.1, 159/25.1; 177/50, 1, 132; 436/174; 422/99; 700/273; 494/10; 997/154

(56) References Cited

U.S. PATENT DOCUMENTS 4,157,781 A * 6/1979 Maruyama ................ 233/23 A
5,665,925 A * 9/1997 Gerteis ........................ 73/865
5,900,590 A * 5/1999 Solberg et al. ................ 177/1

* cited by examiner

*Primary Examiner*—Hezron Williams
*Assistant Examiner*—Nashmiya Fayyaz
(74) *Attorney, Agent, or Firm*—Barnes & Thornburg

(57) ABSTRACT

A method of controlling the evaporation of liquid in samples in an evaporating centrifuge, by monitoring the centrifugal force exerted on a sample holder containing a liquid sample having solid material dissolved or otherwise mixed therein. The centrifugal force is determined using a load cell, a strain gauge or, where relative movement between sample holder and rotor is permitted albeit with resilient restraint, the centrifugal force signal may be generated by a position sensing transducer. The speed of rotation is sensed by a further transducer and both force and speed signals are conveyed to a computer programmed to generate a process control signal for controlling the evaporation process therefrom. A preferred method of control involves determining the rate of change of weight with time and terminating the evaporation process when the rate of change drops to zero. Evaporation is assisted by heating the samples and the process control signals determine not only the speed of rotation, but also the heating of the samples. A weight signal can be computed from the force signal by reference to the speed signal which is proportional to the centrifugal force acting on the sample holder and therefore the sample.

23 Claims, 4 Drawing Sheets

CONTROL OF WEIGHT DURING EVAPORATION OF SAMPLES

FIELD OF INVENTION

This invention relates to a method of and apparatus for controlling the weight of samples dissolved or suspended in a liquid while they are evaporating in a vacuum. It is particularly applicable to samples in centrifugal evaporators.

BACKGROUND TO THE INVENTION

Samples to be evaporated in centrifugal evaporators are usually held in glass or plastic tubes or, sometimes, in a large number of small wells in plastic blocks. The sample holders are mounted upon a rotating assembly and spun at relatively high speed so that a considerable centrifugal force is applied to them in an outward direction, which forces the liquid to the lower part of the sample tubes and prevents any frothing or spitting of the liquid out of the sample tubes when a vacuum is applied. The spinning samples are held in a vacuum-tight chamber (referred to herein as a "chamber") which is connected to a vacuum pumping device.

Centrifugal evaporators of this type are well known and many types are available commercially. One problem from which such evaporators suffer, is that it is very difficult to obtain a desired continuous read-out of the weight of the sample in the holders as the liquid is being evaporated, since the holders are being spun at a high speed, typically at about 1400 r.p.m. The possibility has been considered of continuously weighing the whole evaporator during spinning. However, this involves measuring a total weight of the order of 50 kg to an accuracy of about 1 gm, which is a very demanding task.

Another problem arises when evaporation needs to take place simultaneously for different solvents, or solvent mixtures of differing compositions, in which the samples are dissolved or suspended. In this situation those samples which are held in the more volatile solvents or mixtures will evaporate faster than the ones held in the less volatile solvents, and this can lead to an excessive imbalance in the rotating assembly, and consequent unwanted vibrations. This would also mitigate against the possibility of weighing the whole evaporator.

In most centrifugal evaporator machines such unwanted vibrations are arranged to trip an out-of-balance sensor to thereby stop the machine, but in machines without a sensor the vibrations can cause damage to the machine and even to the samples. Sometimes the vibration problem can be overcome by careful loading of the evaporator, or by stopping the process from time to time and rebalancing the load by adding liquid to empty samples or by rearranging the samples in the rotating assembly. Both these methods are tedious and time consuming.

It is an object of the present invention to enable the weight of a sample in a centrifugal evaporator to be continuously and accurately measured during evaporation.

It is another object of the invention to enable the operation of a centrifugal evaporator to continue despite a considerable imbalance of forces.

SUMMARY OF THE INVENTION

According to one aspect of the present invention, a method of evaporating a liquid sample contained in a sample holder which is mounted within a chamber and rotated by a rotor therein during the evaporation so that centrifugal force is exerted on the contents of the sample holder during the process whilst a pressure below atmospheric is maintained in the chamber in manner known per se, so as to leave as a residue any solid material dissolved or otherwise mixed in the liquid forming the sample, characterised by: mounting a transducer to monitor the force acting on the sample holder relative to the rotor when rotating at a given speed and obtaining a force signal therefrom, supplying the force signal to a computer means, programming the computer means to compute a value equivalent to the centrifugal force exerted on the sample holder due to rotation of the rotor at said given speed, further programming the computer means to compute a weight value from the force signal using the computed centrifugal force, and further programming the computer means to generate a control signal for controlling the evaporation process in dependence on the computed weight value.

In some circumstances the rotor may be rotating at constant speed, so that the weight value can be computed for that particular speed.

Alternatively, however, the method may further comprise the steps of mounting a second transducer to monitor the speed of rotation of the rotor, obtaining a speed signal therefrom, and supplying the speed signal to the computing means for computing said weight value.

Preferably the computing means is adapted to rotate with the rotor.

Preferably the computing means is programmed to convert the output of the sensor into a form suitable for transmission to an external receiver.

Preferably the computing means converts the transducer signals into digital signals by which a carrier signal is modulated to effect the said transmission.

In general the transducer signals are produced continuously and the weight and centrifugal force factor values are continuously computed therefrom.

Conveniently the computing means has stored therein a value equivalent to the weight of the sample holder, and is further programmed to compute a value equivalent to the weight of the contents of the holder by deducting from the computed weight value a value equivalent to the known weight of the sample holder.

Preferably the computer means computes the rate of change of the computed weight value.

Preferably the method includes the step of heating the sample during rotation in the chamber to increase the rate of evaporation.

Preferably the method includes the step of controlling the supply of heat to the sample in dependence on the computed weight value, preferably in dependence on the computed rate of change of weight value.

In general, the supply of heat will be reduced as the rate of change of weight with time starts to decline, and the evaporation process is terminated when the rate of change drops to zero, indicating that the sample is dry.

The invention also lies in apparatus for evaporating a sample comprised of solid material dissolved or suspended in a liquid, comprising a vacuum chamber, a rotor therein, drive means for rotating the rotor relative to the chamber, a sample holder for containing the sample connected to the rotor, transducer means associated with the sample holder and the rotor for generating a force signal indicative of the centrifugal force acting on the sample holder as it is rotated at a given speed, and means for transmitting transducer signals to computing means programmed to convert the signal at any instant to a computer value proportional to weight, the computing means being further programmed to generate a process control signal for controlling the evaporation process in the chamber.

The force transducer may be a load cell, or a strain gauge, or where the sample holder is movable relative to the rotor, the force transducer may be a position sensor adapted to produce a signal indicating the position of the sample holder relative to the rotor, as determined by the instantaneous centrifugal force acting on the sample holder, causing it to move relative to the rotor.

Where the movement is permitted, preferably resilient means is provided which resists the movement of the sample holder relative to the rotor.

A plurality of sample holders may be mounted on the rotor and a force transducer is provided for selected ones, or all of, the holders.

The weight of the sample can be calculated from a force value by taking account of the centrifugal force and deducting the known weight of the holder, but an equally useful measurement is that of the rate of change of weight. This is a direct measurement of mass flow rate and can be used to monitor the progress of the evaporation and to reduce the heat when the rate starts to decline, when the samples are nearly dry and to shut the system down when it drops to 0 indicating that the samples are dry.

According to another aspect of the invention in the processing of samples in a centrifugal evaporator in which the samples are dissolved or suspended in liquids of differing volatility, any imbalance caused during spinning of the rotor and resulting in unwanted vibration is at least partially compensated for by associating with the rotor an automatic balancing unit.

The invention therefore also lies in comprising a vacuum chamber, a rotor mounted therein for rotation in use about a generally vertical axis, a drive means for rotating the rotor, at least two sample holders mounted on the rotor, each sample holder being in use about a generally horizontal axis in a radial manner relative to the axis of rotation, a bearing raceway incorporating a plurality of ball bearings which do not fully occupy the circumferential extent of the raceway and which in rotation are automatically distributed around the raceway to counteract any imbalance forces experienced by the raceway, the bearing raceway being mounted to the rotor or a spindle driving the rotor, thereby to reduce any imbalance caused during the spinning of the rotor as result of differential evaporation of liquids from the sample holder.

The ball bearings may be formed from a high density material such as Tungsten or depleted Uranium.

The invention also lies in a method of measuring the weight of a liquid sample in a sample holder attached to a rotor in a vacuum chamber of an evaporating centrifuge, comprising the steps of mounting a transducer to monitor the force acting on the sample holder relative to the rotor during rotation, supplying a force signal to a computing means having stored therein a stored weight value corresponding to the empty weight of the sample holder, the computing means being programmed to convert the force signal to a weight value for a given speed of rotation of the rotor, the computing means being further programmed to deduct from the computed weight value said stored weight value.

The method may further comprise the steps of monitoring the speed of rotation of the rotor, and supplying a speed signal to the computing means for computing said weight signal.

The weight measuring method may be enhanced by mounting to the rotating parts of the apparatus an automatic balancing aid, to counteract any out of balance force arising from differential evaporation of samples.

Only limited space is available within apparatus as described herein for laboratory use and the like, and therefore it is to advantage to use rolling elements constructed from dense materials such as Tungsten or depleted Uranium, since this allows the overall size of the raceway to be reduced both in depth and diameter, due to the increased mass of the rolling elements obtained by using high density materials therefore.

BRIEF DESCRIPTION OF THE DRAWINGS

The invention will now be described, by way of example only, with reference to the accompanying drawings in which.

DETAILED DESCRIPTION

Figure 1:
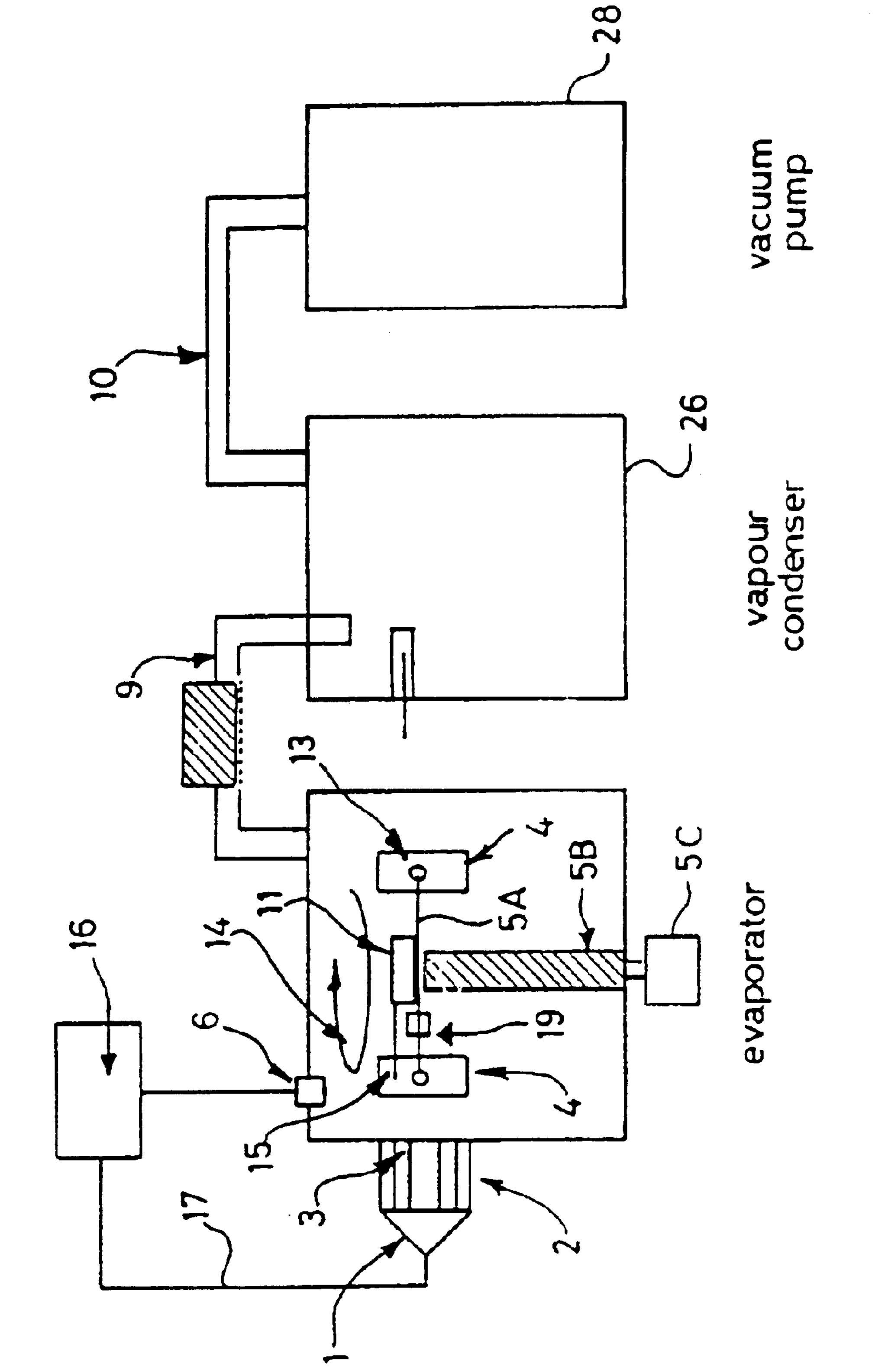
FIG. 1 is a schematic side view of a centrifugal evaporation system incorporating a force measuring transducer in accordance with the invention.

FIG. 1 illustrates a centrifugal evaporator embodying the invention described and claimed herein.

The samples in FIG. 1 are contained in plates or blocks 4 in which there are numerous sample wells (not shown), commonly referred to as deep-well microtitre plates or blocks.

When the sample holder rotor 5A and shaft 5B rotates, driven by a motor 5C, which may be inside but more usually external to the chamber (14), the sample blocks swing out to a position in which the sample wells are horizontal, under the influence of centrifugal force.

The sample blocks are pivoted about swivel pins 13 and the blocks are held with the wells vertical for loading in the a stationary evaporator. Vacuum is then applied to the evaporator chamber 14 via pipe 9 from a vapour condenser 26 which in turn is pumped via pipe 10 by a vacuum pump 28.

Heat is applied to the rotating sample blocks 4 by a heater 1 in the form of a high temperature infra-red radiation source, and a beam of radiant heat energy 2 passes through a window 3 of heat-transparent material such as quartz which is sealed into the wall of the vacuum chamber 14 and reaches the sample holder as illustrated.

A temperature sensor or probe 15 is placed in one of the sample wells, or otherwise placed in close proximity to the wells in one of the sample blocks, and is connected to a transmitter 11 which transmits signals corresponding to the sample temperature to an aerial and feedthrough 6 inside and extending through the chamber wall, and which is connected to an external receiver and decoder 16. The decoder includes data processing and computing facilities, as required, and indicates the sample temperature by a display (not shown) and, if required, can be programmed to generate electrical signals to control the operation of the heater in order to increase or decrease the heat energy to keep the samples at desired temperatures during the process. Such control signals are supplied to the heater 1 via a connection 17.

It is important that as far as possible all the samples evaporate at the same rate. To achieve this, all the samples should receive the same heat input by directing the heat to them so as to heat all the sample holders uniformly. A common form of sample holder is the deep-well microtitre plate or block 4, in which there are typically 96 wells.

Each block 4 is mounted on the swivel pin 13 so that when it is initially loaded onto a stationary rotor 5A the open ends of the wells face upwards; but as soon as the rotor 5A is rotated at a sufficient speed, the blocks 4 swing into a position in which the wells are almost horizontal, as is in fact shown in FIG. 1. In this position the infra-red beam 2 is directed horizontally onto the closed ends of the sample wells, in which configuration it is possible to achieve uniform heating of the wells.

Even with perfectly uniform heat input the samples will not evaporate at a uniform rate because of a so-called "cold neighbour effect". If the samples are in thermal contact with each other, as is the case for example in a microtitre plate or block 4, the outer samples only have evaporating (and therefore "cold") neighbours on three or (for corner samples) two sides, and therefore do not lose as much heat to their neighbours as those in the centre which have four "cold" neighbours. Also two of an outside sample's neighbours will generally be less cold than those of the inner samples. Outer samples therefore can evaporate faster than centrally located samples.

This effect can be reduced or eliminated by reducing the heat input to the outer samples. A simple way of doing this in the preferred infra-red heating case, is to provide graduated shading from the infra-red beam 2 by, for example, placing a metal screen between the sample holder and the heater 1. The screen contains graduated perforations so that those in the outer region transmit much less radiation than do those in the central region, and those in intermediate regions, which have an intermediate size thereby transmit greater quantities of heat than do the outer ones.

Although the sample holder (4) illustrated is described as being a deep-well microtitre block or plate, the same techniques may be employed to obtain uniform temperature and graduated heating as described above, when using arrays of tubes, bottles or vials in holders which swing out on swivels in a similar manner.

The power of the heater 1 is controlled by measuring sample temperature or chamber pressure and taking appropriate steps to raise or lower the heater power. Thus at the start of the process a high heat input is required, but as the samples approach dryness the evaporation rate will reduce and the sample temperature will start to rise so that the heat input must be reduced to avoid overheating the sample, and when the samples are dry, the heating must be discontinued.

The vapour condenser 26 is used in centrifugal evaporation equipment to increase pumping speed for the liquid being evaporated and to protect the vacuum pump 28 from vapours which might impair its efficiency. Such a condenser is a vessel held at low temperatures at which the vapours being evaporated condense or solidify.

If the condenser 26 is located between the vacuum pump 28 and the evaporation chamber 14, as shown in FIG. 1, the pressure in the chamber 14 cannot be reduced below the vapour pressure of any condensed liquid remaining in the condenser 26. This is due to the evaporation of condensed material which will take place in the condenser if the system pressure is reduced to a level approaching the vapour pressure of the condensed material left in the condenser 26. This phenomenon, especially if a more volatile material has been left in the condenser 26 from a previous run, can make chamber pressure a rather insensitive technique for sensing sample temperature at the end of evaporation to indicate when the samples are dry, and it may be unreliable as a means for determining when the equipment can be shut down.

The measurement of vapour flow rate is a more useful monitor of the evaporation process. By thus monitoring flow rate, information can be obtained about a process to indicate when to turn off the heater, since when the samples are nearly dry the flow rate will become low. This enables equipment to be reliably shut down when the process is finished (ie the samples are dry).

Flow rate through the condenser or the pipe 9 between the chamber 14 and the condenser 26 can be monitored by any convenient technique.

In accordance with the present invention, a load cell 19 is attached between each plate or block 4 and its support. The load cell produces an electrical signal indicative of the horizontal force on the block which, when the rotor is spinning, will be proportional to the combined weight of the sample and the sample holding assembly. Since the latter is constant the sample weight can readily be obtained. Of course, the apparent weight will be exaggerated by a factor due to the centrifugal force, but this factor will not vary for a given rotor speed. In some arrangements the rotor speed may be kept constant; however, where the speed is variable it is important also to monitor the rotational speed of the rotor and sample holders.

Figure 3:
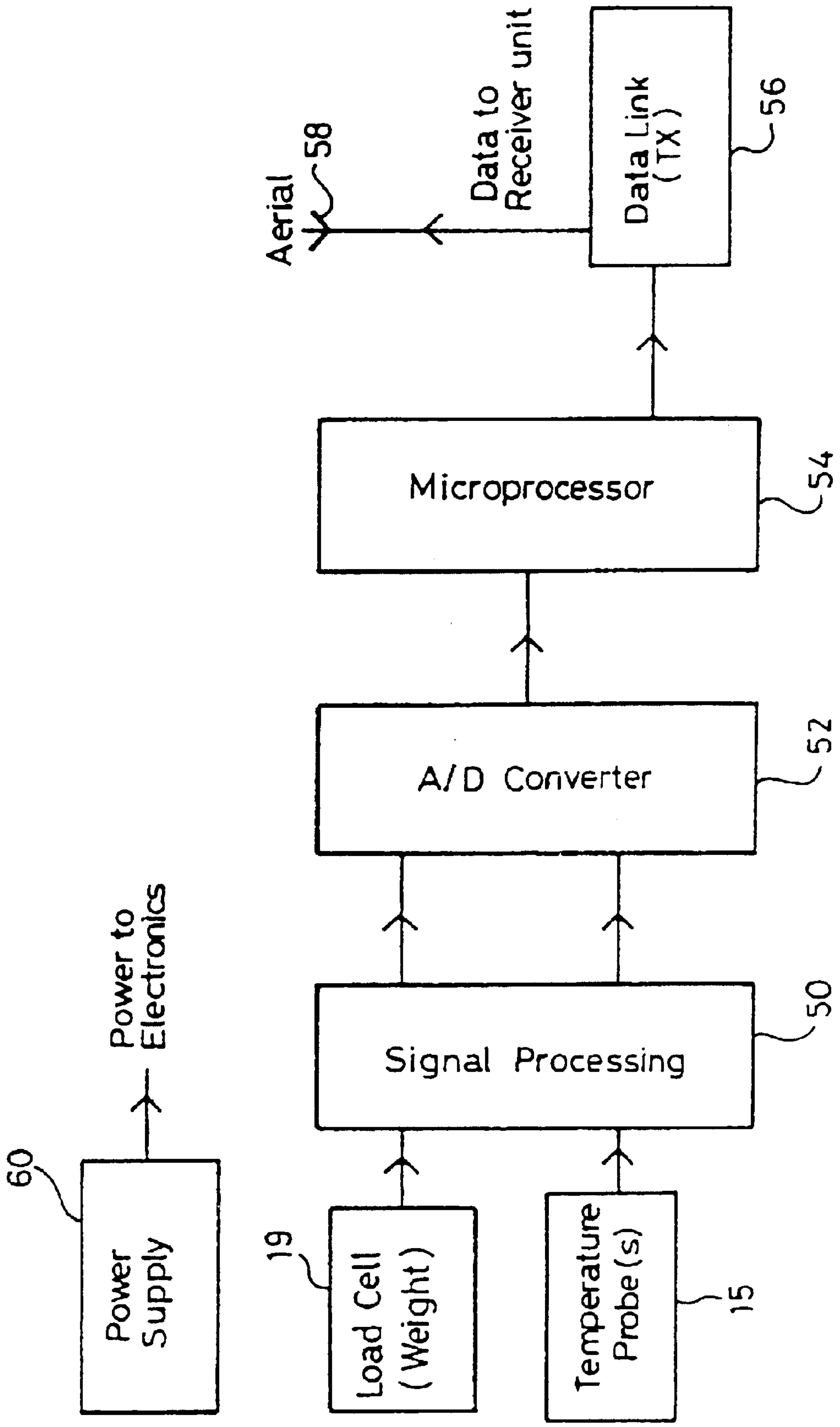

FIG. 3 shows the important components of the monitoring system for a chamber 14, such as shown in FIG. 1. Each temperature probe 15 connects to an input of a signal processor 50, the output of which is digitised by an A/D converter 52 for supply to a microprocessor 54 which handles the modulation of a radio signal in a transmitter 56 to which signals are supplied from the microprocessor for radiation by an antenna 58. Power for the system may be from a battery or a mains supply 60. Except for the probe 15 and the antenna 58, all the units shown in FIG. 3 may be housed within a housing located on the sample holder rotor 5A, so that there is no relative movement between the housing and the probe 15. The chamber 14 must be constructed so that at least part of its wall is capable of transmitting the radio signals from the antenna.

The force signals from the load cell 19 are processed and transmitted to a receiver and decoder outside the chamber via a separate transmission channel on the signal processing circuit of FIG. 3.

Figure 4:
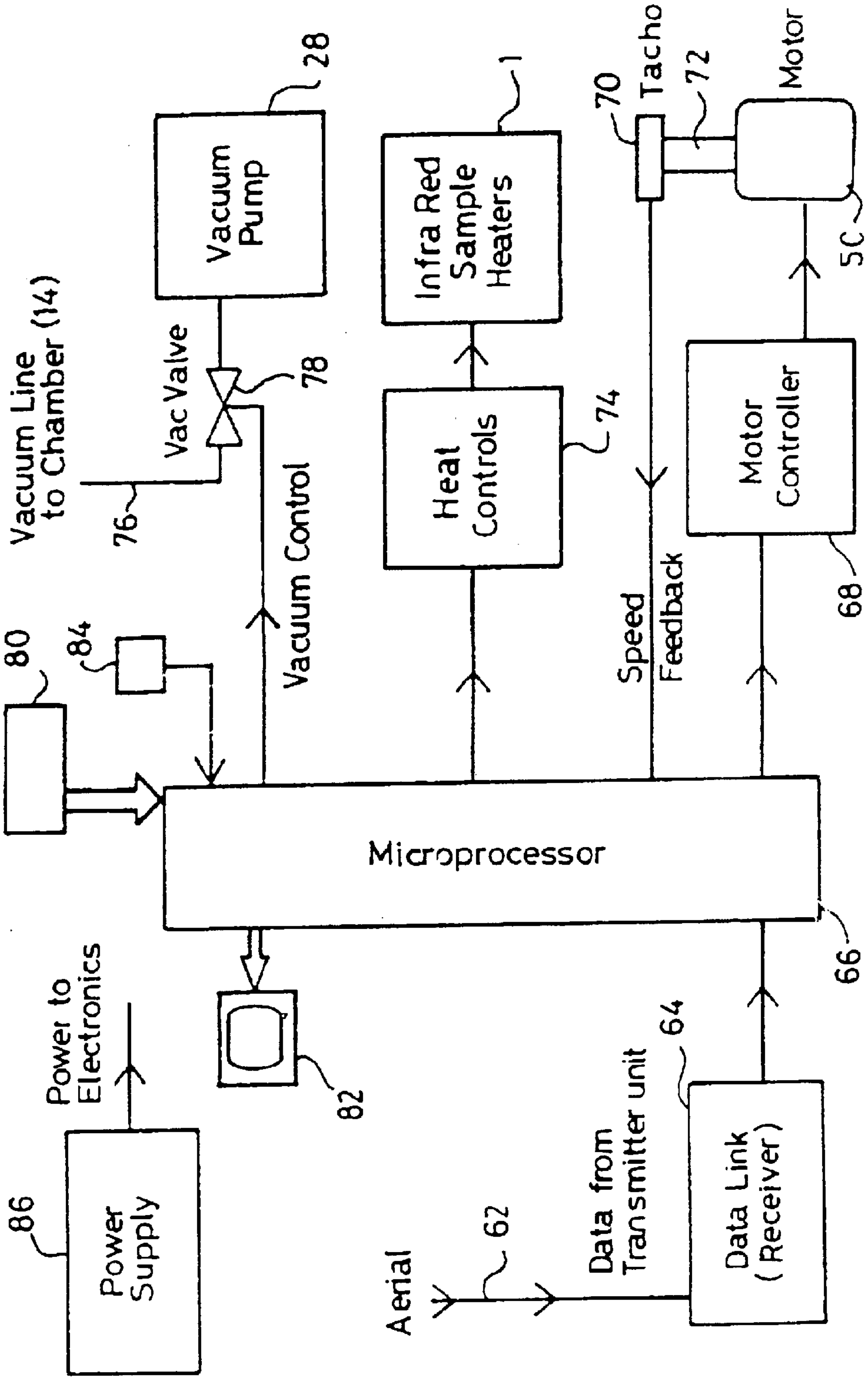

A receiver and control system for locating outside the chamber 14 is shown in FIG. 4.

Here the receiver antenna 62 feeds radio signals to a receiver and decoder 64 which supplies decoded digital data signals (corresponding to those from the A/D converter 52 in FIG. 3), to a second microprocessor 66. This controls the supply of digital signals to a motor controller 68 which controls the speed of rotation of the drive motor 5C (also shown in FIG. 1). A tacho-generator 70 is attached to the motor shaft 72 and provides a speed signal for the microprocessor 66.

An infra-red heater 1 (see also FIG. 1) is controlled by a power controller 74 which in turn is controlled by signals from the microprocessor 66, to reduce the heat output from the heater 1 as an evaporation process progresses, so as to reduce the risk of overheating as samples dry and are no longer cooled by evaporative cooling effects.

The vacuum pump 28 of FIG. 1 is shown associated to the chamber 14 via a pipeline 76 which includes a valve 78 also under the control of signals from the microprocessor 66. The latter includes a memory in which operating system software and data relating to different volatile liquids are stored and a data entry keyboard or other device 80 allows data to be entered initially and volatile components to be identified to the system. A display screen 82 assists in the entry of data and the display of monitored values of temperature from probe 15 and pressure from a probe 84 in the chamber, and of force (and therefore by computation weight) from load cell 19.

The memory also stores the values of force signals from load cell 19 when an empty standard sample holder is rotating around the chamber, and factors by which force signal values can be converted to weight for different rotational speeds (from the tacho 70) and therefore different g-forces. It can also store weight values for empty sample holders such as mitrotitre plates or blocks.

Power for the system of FIG. 4 may be from a battery or a mains driven power supply 86.

Experiments have shown that weights of samples in holders weighing up to 1200 gm can be determined using this apparatus and approved to an accuracy of better than 1 gm.

The microprocessor 66 can be programmed to compute the rate of change of weight with time, and this or the monitored force value can be used to determine when the samples have been fully evaporated, and therefore the point at which the samples are completely dry. This enables the correct moment to be identified when to switch off heat to the samples.

Figure 2:
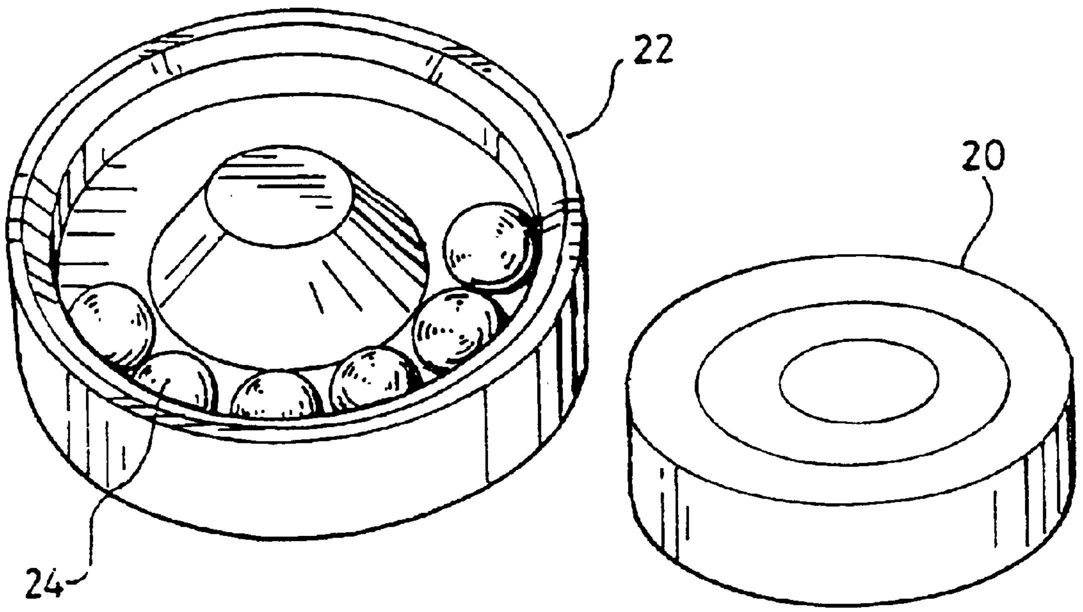
FIG. 2 is a perspective view of a dissembled automatic balancing unit associated with the rotor of FIG. 1, and FIGS. 3 and 4 are block schematic diagrams showing the probes and control system as employed in an evaporator such as shown in FIG. 1 embodying the invention.

FIG. 2 shows a proprietary automatic balancing unit 20,22 which is fitted to the rotor shaft 5B as close as possible to the rotor 5A carrying the plates or blocks 4. Vibration caused by rotor imbalance is likely to occur when solvents of different volatility are used for the samples.

The unit 20, 22 may be an Auto-Balancing unit produced by the bearing manufacturing company SKF.

As shown in FIG. 2, the unit comprises inner and outer raceways 20 and 22 between which a number of loose ball bearings 24 are freely movable. The ball bearings distribute themselves automatically to counteract the imbalance in the rotor shaft 5.

In the known forms of autobalancing units of this type the ball bearings 24 are normally made of steel, but a greater balancing capability can be obtained by using balls of a heavier material, for example Tungsten or depleted Uranium. The use of higher density metal for the balls allows the same out-of-balance forces to be counteracted using a raceway assembly 20, 22 of small dimensions, both in width and diameter.

One unit which has been used to advantage is the Auto-Balancing device produced by the company SKF such as is described in WO98/01733.

What is claimed is:

1. A method of evaporating a liquid sample contained in a sample holder which is mounted within a chamber and rotated by a rotor at speeds which are monitored to produce speed signals therein during the evaporation so that a centrifugal force is exerted on the contents of the sample holder during the process whilst a pressure below atmospheric is maintained in the chamber in manner known per se, so as to leave as a residue any solid material dissolved or otherwise mixed in the liquid forming the sample, comprising the steps of:

mounting a transducer to monitor the centrifugal force acting on the sample holder relative to the rotor when rotating at a given speed and obtaining a force signal therefrom, supplying the force signal to a computing means, programming the computing means to compute a value equivalent to the centrifugal force exerted on the sample holder due to rotation of the rotor at said given speed, further programming the computing means to computer a weight of the liquid sample and sample holder from the force signal using the computer centrifugal force, and further programming the computing means to generate a control signal for controlling the evaporation process in dependence on the computed weight, wherein the computing means includes a microprocessor adapted to rotate with the rotor.

2. A method as claimed in claim 1, further comprising the steps of mounting a second transducer to monitor the speed of rotation of the rotor, obtaining a speed signal therefrom, and supplying the speed signal to the computing means for computing said weight.

3. A method of measuring the weight of a liquid sample in a sample holder attached to a rotor in a vacuum chamber of a centrifugal evaporator, comprising the steps of mounting a force transducer to monitor the force acting on the sample holder relative to the rotor during rotation, supplying a force signal from the transducer to a computing means having stored therein a stored weight value corresponding to the empty weight of the sample holder, the computing means being programmed to convert the force signal to a computed weight of the liquid sample and sample holder for a given speed of rotation of the rotor, the computing means being further programmed to deduct said stored weight value from the computed weight, the computing means comprising a microprocessor adapted to rotate with the rotor.

4. A method as claimed in claim 1, wherein the computing means is programmed to convert the force signal from the transducer into a form suitable for transmission to an external receiver.

5. A method as claimed in claim 4, wherein the computing means converts the force signal from the transducer into a digital signal by which a carrier signal is modulated to effect the said transmission.

6. A method as claimed in claim 1, wherein the force and speed signals are produced continuously and the weight and centrifugal force are continuously computed therefrom.

7. A method as claimed in claim 6, wherein the computing means has stored therein a value equivalent to the known weight of the sample holder, and is further programmed to compute a value equivalent to the weight of the contents of the holder by deducting from the computed weight a value equivalent to the known weight of the sample holder.

8. A method as claimed in claim 1, wherein the computing means computes the rate of change of the computed weight.

9. A method as claimed in claim 1, further comprising a step of heating the sample during rotation in the chamber to increase the rate of evaporation.

10. A method as claimed in claim 9, comprising a step of controlling a supply of heat to the sample in dependence on the computed weight.

11. A method as claimed in claim 8, comprising a step of controlling a supply of heat in dependence on the computed rate of change of weight.

12. A method as claimed in claim 11, wherein the supply of heat is reduced as the rate of change of weight with time starts to decline, and the evaporation process is terminated when the rate of change drops to zero, indicating that the sample is dry.

13. Apparatus for evaporating a sample comprised of solid material dissolved or suspended in a liquid, comprising a vacuum chamber, a rotor therein, drive means for rotating the rotor relative to the chamber, a sample holder for containing the sample and connected to the rotor, force transducer means associated with the sample holder and the rotor for generating a force signal indicative of the centrifugal force acting on the sample holder when rotated at a given speed, and means for supplying the force signal to computing means external of the rotor programmed to convert the force signal at any instant to a computed value proportional to weight of the sample and sample holder, the computing means being further programmed to generate a process control signal for controlling the evaporation process in the chamber and including a microprocessor rotatable with the rotor.

14. Apparatus as claimed in claim 13, further comprising second transducer means associated with the rotor for generating a speed signal corresponding to the speed of rotation of the rotor, the speed signal being transmitted to the computing means for computing said weight.

15. Apparatus as claimed in claim 13, wherein the force transducer means is a load cell.

16. Apparatus as claimed in claim 13, wherein the force transducer means is a strain gauge.

17. Apparatus as claimed in claim 13, wherein the sample holder is movable relative to the rotor, and further comprising a position sensor adapted to produce a signal indicating the position of the sample holder relative to the rotor, as determined by the centrifugal force acting on the sample holder, causing the sample holder to move relative to the rotor.

18. Apparatus as claimed in claim 17 wherein a resilient means resists the movement of the sample holder relative to the rotor.

19. Apparatus as claimed in claim 13, wherein a plurality of sample holders are mounted on the rotor and a force transducer is provided for at least each selected ones of the holders.

20. Apparatus as claimed in claim 13, wherein a mechanical device is attached to the rotor, or to a spindle on which the rotor is carried and by which the rotor is rotated, which device automatically adjusts the device centre of mass in response to out-of-balance forces acting on the rotor due to differential evaporation of samples.

21. Apparatus according to claim 13 in which there are at least two sample holders mounted on the rotor, each sample holder being pivotal in use about a generally horizontal axis in a radial direction relative to the axis of rotation, and further comprising a bearing raceway incorporating a plurality of ball bearings which do not fully occupy the raceway and which ball bearings in rotation are automatically distributed around the raceway to counteract any imbalance forces, the raceway being mounted to the rotor or a spindle driving the rotor, thereby to reduce any imbalance caused during rotation of the rotor as result of differential evaporation of liquids from each sample holder.

22. Apparatus as claimed in claim 21, wherein the ball bearings are formed from a high density material of a group comprising Tungsten and depleted Uranium.

23. A method as claimed in claim 3, further comprising the steps of monitoring the speed of rotation of the rotor, and supplying a speed signal to the computing means for computing said computed weight.

* * * * *